United States Patent [19]

Frantello

[11] 4,290,257

[45] Sep. 22, 1981

[54] ROTARY ASSEMBLY FOR CUTTING GRASS AND OTHER VEGETATION

[76] Inventor: Alfred A. Frantello, 26 Rainbow Dr., Satellite Beach, Fla. 32937

[21] Appl. No.: 179,873

[22] Filed: Aug. 20, 1980

Related U.S. Application Data

[63] Continuation-in-part of Ser. No. 105,080, Dec. 19, 1979, which is a continuation-in-part of Ser. No. 932,991, Dec. 15, 1978, abandoned.

[51] Int. Cl.³ .................... A01D 50/00; A01D 53/00
[52] U.S. Cl. ........................................ 56/12.7; 30/276
[58] Field of Search ................... 56/12.7, 295; 30/276

[56] References Cited

U.S. PATENT DOCUMENTS

| | | | |
|---|---|---|---|
| 4,054,993 | 10/1977 | Kamp et al. | 56/12.7 |
| 4,062,114 | 12/1977 | Luick | 30/276 |
| 4,065,913 | 1/1978 | Fisher et al. | 56/12.7 |
| 4,097,991 | 7/1978 | Proulx | 56/12.7 |
| 4,112,653 | 9/1978 | Ballas et al. | 56/12.7 |
| 4,126,990 | 11/1978 | Fisher et al. | 56/12.7 |
| 4,201,034 | 5/1980 | Frantello | 56/12.7 |
| 4,232,505 | 11/1980 | Walto | 56/12.7 |

*Primary Examiner*—Paul J. Hirsch
*Attorney, Agent, or Firm*—Robert U. Geib, Jr.

[57] ABSTRACT

An attachment for the lower end of a vertical drive-shaft of a wheel-mounted power mower of the rotary lawn mower type comprises a balanced assembly of centrally-bored shaft-engaging hub together with a plurality of equi-distantly spaced radially extending arms each of which carries a boss or lateral enlargement adjacent its outer end for receiving a quickly and easily replaceable flexible cutting line which projects freely therefrom in the general direction of the arm by which it is carried. The lower end of the vertical drive-shaft of the prime mover of the rotary mower, which ordinarily receives the mid-section of a rigid metallic cutting blade that is sharpened adjacent each of its ends, is attached to the hub of the rotary assembly of the invention, suitable adapter means being provided for accommodating driveshafts of different sizes. The upper surfaces of the arms which extend radially from the hub are provided with means for generating air currents in a vertical direction during the cutting operation which will cause the vegetation to extend upwardly prior to and during its being cut. A preferred embodiment includes anti-friction bearing means carried on the lateral extensions on the outer ends of the radially-extending arms for supporting the replaceable flexible cutting lines for free rotation upon their axes upon contact with the vegetation during the rotation of the hub, which thereby substantially reduces wearing of the flexible lines by its frictional contact with the vegetation.

7 Claims, 3 Drawing Figures

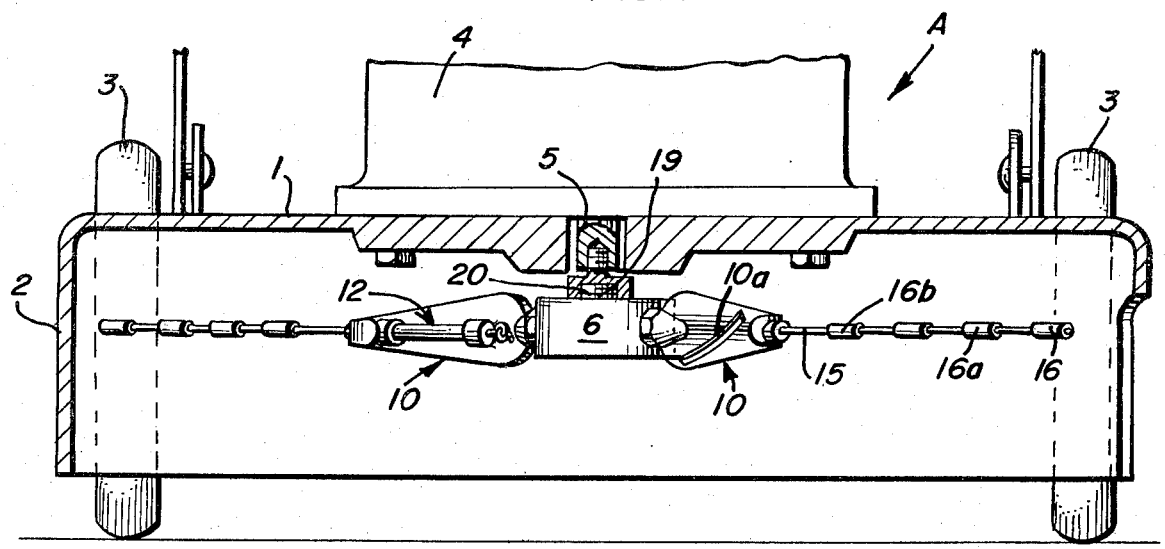
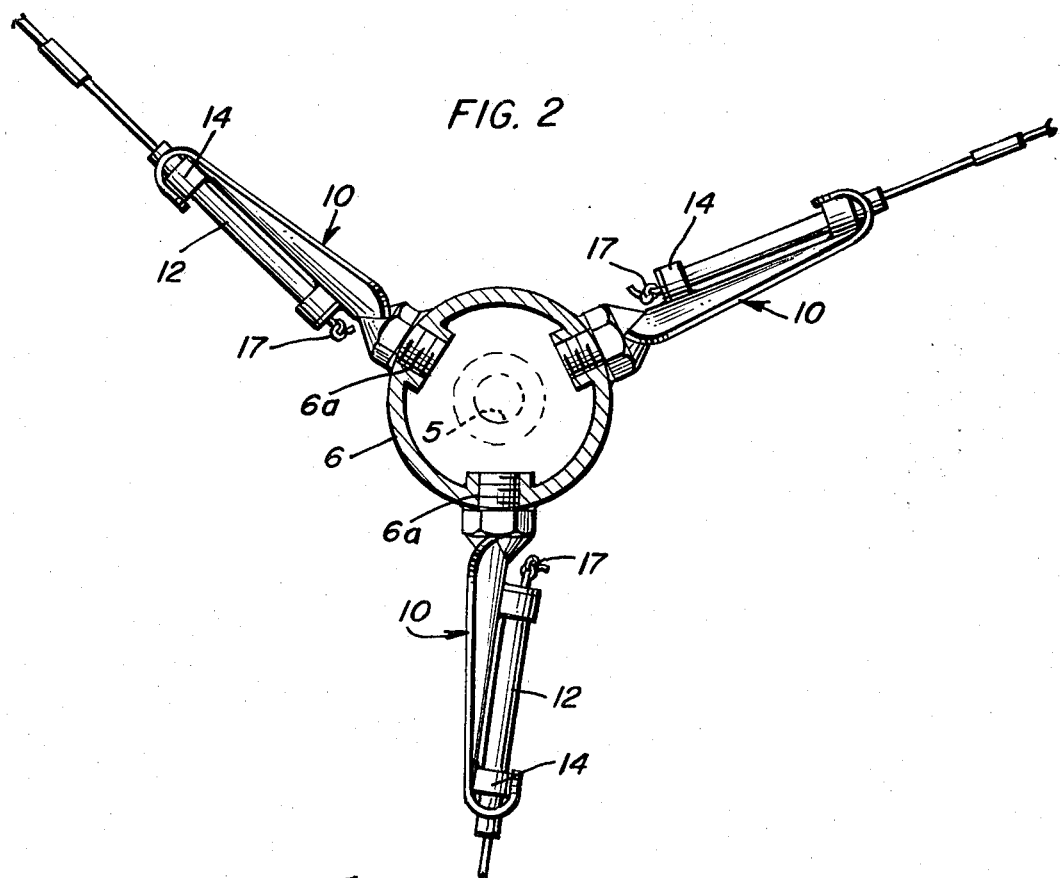
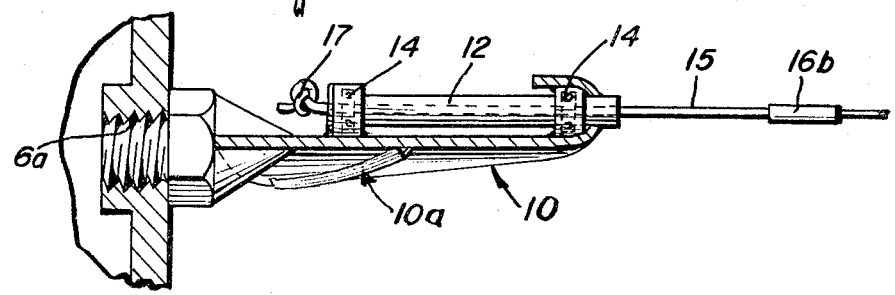

ROTARY ASSEMBLY FOR CUTTING GRASS AND OTHER VEGETATION

The present application is a continuation-in-part of my co-pending patent application Ser. No. 105,080, filed Dec. 19, 1979, which is, in turn, a continuation-in-part of my co-pending patent application Ser. No. 932,991, filed Dec. 15, 1978 now abandoned.

BACKGROUND OF THE INVENTION

Many attempts have been made in the past to eliminate the dangers and other shortcomings of metallic cutting heads on the lowermost ends of the vertically disposed drive-shafts of rotary power mowers, the same being most frequently in the form of a transversely-extending rotatable metal bar which is sharpened adjacent its outer ends. The hazardous conditions created by such metallic cutting heads, be they in the form of metallic bars or otherwise, are very well-known, including the dangerous outward propelling by said heads of solid objects of various kinds.

Most of the past attempts to eliminate these hazardous conditions, which are caused by the use of metallic cutting heads of the type referred to, have been the adoption of flexible flails which possess sufficient resiliency to eliminate the outward propelling of solid objects which are contacted at high speeds; but it has been definitely established that mere resiliency is not sufficient to completely overcome the hazardous conditions during rotation of the flexible flails at the necessary high cutting speeds. In addition, the flexible flails of the prior art are usually not provided with easy and inexpensive means for ready replacement of worn flails as caused by frictional contact with the grass or other vegetation. Further, most, if not practically all, of the prior art devices which utilize flexible cutting flails are in the form of hand-carried trimming devices that utilize relatively short lengths of flexible cutting line as paid-out, or dispensed from, a spool and can operate upon only a very small cutting site preparatory to the movement of the device onto a new and uncut or untrimmed area.

OBJECTS OF THE INVENTION

It is among the objects of the invention to overcome the aforementioned and other disadvantages of the devices of the prior art by the provision of an improved relatively simple rotary cutting head or assembly which utilizes flexible flails, such as those of the monofilament variety, and which is primarily intended for actual mowing operations as conducted from a wheeled carriage rather than hand-separated small area trimming devices, although by no means limited thereto.

Another object is the attainment of the foregoing objectives with a rotary cutting assembly which is simple and inexpensive to manufacture, efficient and durable in service, and which may be quickly and easily attached to the lower end of the vertical drive-shaft of a rotary mower, including those of existing size and design.

Still another object is the provision of a rotary cutting assembly of the type described wherein the flexible cutting flails or lines are not only longer wearing, but which may, when desired, be easily and quickly replaced.

The foregoing and other features and advantages of the invention will become more fully understood from the following description and annexed drawings wherein like reference characters refer to like parts.

IN THE DRAWINGS

FIG. 1 is an elevational view of a rotary mower possessing a vertically disposed drive-shaft to the lower end of which there is attached a rotary cutting assembly which embodies the teachings of the present invention.

FIG. 2 is a plan view which discloses the rotary cutting assembly as detached from the lower end of the vertical drive-shaft of the rotary power mower.

FIG. 3 is an enlarged fragmentary view, partially in section, and illustrating in further detail the outer end of one of the arms or blades which extend radially from the centrally apertured hub of the rotary cutting assembly.

Referring more particularly to the drawings, the reference character A generally represents a rotary mower for lawns etc. which may be of an entirely conventional design and which comprises a housing 2 mounted on adjustable wheels 3 which carries a prime mover 4 such as an internal combustion engine or electric motor possessing a vertical drive-shaft 5 which extends through the top of the housing 2 and projects therebeneath to carry the cutting instrumentality which heretofore has usually been in the form of a horizontally extending cutting bar that is sharpened adjacent each of its ends.

In the manner well known in the art, the housing 2 carries an attached steering handle and in some instances control devices for the prime mover 4, neither of which are shown.

As shown most clearly in FIG. 2 the rotary cutting assembly of the invention comprises a hub 6 having a central aperture 8 for receiving the lower end of the drive-shaft 5 of the prime mover 4.

Radially extending from the periphery of the hub 6 is a plurality of equi-distantly spaced arms or blades 10, in the present instance three in number being illustrated. For convenience in repair or replacement, the inner ends of the radially extending arms or blades 10 may be removably attached to the periphery of the hub by screw-threading thereinto, as shown at 6a.

As indicated most clearly in FIG. 3 the outer end of each of the radially extending arms or blades 10 carries a generally tubular member 12 having a bore 13 which extends therethrough in the general direction of the axis of the radially extending arm or blade on which it is mounted. Each end of the bore 13 is provided with a centrally apertured anti-friction bearing 14.

In operative position, the largest area of each of the radial arms or blades 10 is concavo-convex with the inwardly curved portion facing the direction of rotation; and this portion carries thereon one or more air-agitating vanes 10a which causes the grass or other vegetation thereunder to extend upwardly during the cutting operation.

A section 15 of flexible cutting line is disposed to extend through the anti-friction bearings 14 in the longitudinal bore 13 of each of the generally tubular members 12 and projects outwardly therefrom into proximity with the interior of the housing 2 of the rotary power mower A. It is these projecting portions of the section 16 of flexible cutting line that perform the actual mowing, cutting, or trimming operation in accordance with the teachings of the present invention, the movement thereof being directed by a single balanced rotary cutting assembly which comprises the centrally bored hub 6 and the plurality of equi-distantly spaced radially-extending arms or blades 10.

The lower end of that portion of the vertical drive shaft 5 of most conventional rotary lawn mowers which extends below the underside of the housing 2 is usually of more or less standard diameter and provided with means for the attachment thereto of the conventional horizontally extending metallic cutting blade. This attaching means may take the form of a threaded recess 19 which is sometimes found in the lower end of the drive shaft 5 and into which may be fitted a bolt 20 which is secured to the hub 6 and extends upwardly in the central aperture 8 of the hub. However, other shaft attaching means may be utilized, including well-known shaft-size adapters, etc.

It will be understood that the drive shaft connecting means, whether or not it comprises a shaft-size adapter, as such forms no part of the present invention.

The inner end of the relatively short monofilament lines 15 is knotted as at 17 to prevent its being thrown by centrifugal force out of its generally tubular member 12.

The outer extremity of each of the relatively short flexible lines or flails 15 is provided with a ferrule or tip 16 of metal or other suitable material, and additional ferrules 16a and 16b may be affixed to the intermediate portions of the lines or flails 15. These serve to reduce wear on the flexible lines 15 by causing rotation upon their coming into contact with the grass or other vegetation being cut, and toward these ends various peripheral contours of the ferrules may be utilized.

The invention also contemplates the provision of integral protuberances of various kinds on the flexible lines themselves.

The arrangement described immediately hereinbefore is to be greatly distinguished from hand-supported trimming devices employing a hub or centrally-disposed member that dispenses a single radially extending portion of a flexible cutting line which is carried on a spool, such prior art devices providing a partial housing with a very large cut-away section through the agency of which the flexible cutting line from the spool may come into contact with the grass or other vegetation to be cut.

The balanced rotary cutting assembly of the present invention as described hereinbefore, when secured to the lower end of the vertical drive-shaft of a wheeled rotary power mower, produces very even mowing results which are noticeably superior to any other rotary mowing device of which I am aware.

Having thus described the invention, what is claimed as new and desired to secure by Letters Patent is set forth in the annexed claims.

I claim:

1. A balanced rotary cutting assembly for attachment to the lower end of the drive-shaft of a housed rotary power mower for cutting grass and other vegetation, said balanced rotary cutting assembly comprising
   (a) a centrally-bored hub member;
   (b) a plurality of equi-distantly spaced radially-extending arms carried by said centrally-bored hub member;
   (c) each of said equi-distantly spaced radially-extending arms being provided adjacent its outer end with an axially offset boss having a longitudinal bore extending therethrough;
   (d) a readily replaceable section of flexible cutting line extending through the longitudinal bore of the axially offset boss adjacent the outer end of each of said radially-extending arms and projecting therefrom into proximity with the inner surface of the aforementioned housing of the rotary power mower; and
   (e) each of said readily replaceable flexible cutting lines possessing an axially enlarged inner end of sufficient diameter to prevent its axial movement into the adjacent end of the longitudinally bored boss on the radially-extending arm by which it is carried.

2. The balanced rotary cutting assembly of claim 1, together with an air-agitating vane carried on the leading surface of each of said radially-extending arms which is capable of causing the grass or other vegetation which is under the housing of the rotary power mower to be raised upwardly with respect thereto.

3. The balanced rotary cutting assembly of claim 1 wherein the centrally-bored hub member is provided with adapter means for accommodating drive-shafts of different diameters.

4. The balanced rotary cutting assembly of claim 1 wherein the diameters of the readily replaceable flexible cutting lines with respect to the diameters of the longitudinal bores of the axially offset bosses adjacent the outer ends of the radially-extending arms are such that said flexible cutting lines may freely rotate upon contact with the grass or other vegetation being out.

5. The balanced rotary cutting assembly of claim 1, together with anti-friction bearings carried by said longitudinally bored bosses for rotatably supporting those portions of said readily replaceable sections of flexible cutting line which are disposed therein.

6. The balanced rotary cutting assembly of claim 1 wherein the centrally-bored hub member is provided with adapter means for accommodating drive-shafts of different diameters, and wherein the diameters of the readily replaceable flexible cutting lines with respect to the diameters of the longitudinal bores of the axially offset bosses adjacent the outer ends of the radially-extending arms is such that said flexible cutting lines may freely rotate upon contact with the grass or other vegetation being cut.

7. The balanced rotary cutting assembly of claim 1 wherein the centrally-bored hub member is provided with adapter means for accommodating drive-shafts of different diameters, together with anti-friction bearings carried by said longitudinally bored bosses for rotatably supporting those portions of said readily replaceable sections of flexible cutting line which are disposed therein.

* * * * *